United States Patent
Ishihara et al.

(10) Patent No.: US 6,870,793 B2
(45) Date of Patent: Mar. 22, 2005

(54) AUTOMATICALLY TRACKING SCANNING SONAR

(75) Inventors: Shinji Ishihara, Nishinomiya (JP); Yasuo Ito, Nishinomiya (JP); Nobuharu Yamashina, Nishinomiya (JP)

(73) Assignee: Furuno Electric Company, Ltd., Nishinomiya (JP)

( * ) Notice: Subject to any disclaimer, the term of this patent is extended or adjusted under 35 U.S.C. 154(b) by 0 days.

(21) Appl. No.: 10/397,355

(22) Filed: Mar. 27, 2003

(65) Prior Publication Data

US 2003/0202426 A1 Oct. 30, 2003

(30) Foreign Application Priority Data

Apr. 24, 2002 (JP) ........................................ 2002-122527

(51) Int. Cl.[7] .......................... G01S 15/66; G01S 15/96
(52) U.S. Cl. .......................... 367/104; 367/88; 367/103
(58) Field of Search .......................... 367/88, 103, 131, 367/104

(56) References Cited

U.S. PATENT DOCUMENTS

| 4,935,906 A | * | 6/1990 | Baker et al. ................ 367/104 |
| 5,148,412 A | * | 9/1992 | Suggs ........................ 367/131 |
| 6,084,827 A | * | 7/2000 | Johnson et al. ............. 367/103 |
| 6,192,006 B1 | * | 2/2001 | Iino et al. .................... 367/121 |

FOREIGN PATENT DOCUMENTS

| JP | 357026770 | * | 2/1982 | ............. G01S/7/62 |
| JP | 10-90411 A | | 4/1998 | |

OTHER PUBLICATIONS

Patent Abstracts of Japan, Pub. No. 05–232225, Sep. 7, 1993.

* cited by examiner

Primary Examiner—Ian J. Lobo
(74) Attorney, Agent, or Firm—Birch, Stewart, Kolasch & Birch, LLP

(57) ABSTRACT

An automatically tracking scanning sonar alternately performs horizontal scanning and vertical scanning and a target lock processor calculates a predicted position of a target based on an echo signal previously received from the target when the echo signal from the target is interrupted. A selector sets a range, tilt angle and sounding direction and outputs them to a transmit-receive controller such that the scanning sonar can scan the predicted target position. As the depth of the target is determined by performing the vertical scanning, the tilt angle of an umbrellalike beam pattern produced by the horizontal scanning can be varied to follow the target by controlling the tilt angle based on target depth information even when the target moves in vertical directions. It is therefore possible to automatically track the target in a reliable fashion.

11 Claims, 15 Drawing Sheets

AUTOMATICALLY TRACKING SCANNING SONAR

BACKGROUND OF THE INVENTION

1. Field of the Invention

This invention relates to a scanning sonar designed to automatically track underwater targets, such as fish.

2. Description of the Prior Art

A scanning sonar is an underwater sounding apparatus which typically emits an ultrasonic sounding beam in all directions underwater with a specific tilt angle from water surface, receives echo signals returning from underwater targets all around and displays target images based on the echo signals. FIG. 12 is a diagram showing a general principle of the scanning sonar. Referring to FIG. 12, designated by the numeral 50 is a scanning sonar installed on a ship 51, designated by the numeral 52 is a transducer of the scanning sonar 50, designated by the numeral 53 is an ultrasonic transmitting beam emitted from the transducer 52, and designated by the numeral 54 is water surface. The ultrasonic transmitting beam 53 is transmitted underwater simultaneously in all directions around the transducer 52, forming an umbrellalike beam pattern directed obliquely downward with a specific tilt angle δ. After the ultrasonic transmitting beam 53 is transmitted, the transducer 52 produces a receiving beam 57 which is rotated at a high speed in a spiral pattern around the transducer 52 to receive echo signals from fish schools, bottom and other underwater objects. Echoes of such underwater objects are displayed in colors on-screen according to intensities of the received echo signals.

In actual fishing operation, it is important to know not only the locations (distance, direction and depth) of fish schools but also their moving directions and speeds in order that fishermen can correctly deploy fishing gear. For this reason, some types of scanning sonars offer a target tracking feature which enables users to automatically track their aimed fish school. FIGS. 13A–13C are diagrams showing examples of pictures shown on a screen 60 presented by this kind of automatically tracking scanning sonar, in which the numeral 61 indicates an own ship mark shown on the screen 60, the numeral 62 indicates a blip representing an echo of a fish school, and the numeral 63 indicates a target lock mark placed on the echo 62 of the fish school to automatically track it. The target lock mark 63 can be entered at a desired position on the screen 60 by performing a particular operation on an operator panel which is not shown.

To start automatic tracking, an operator places the target lock mark 63 on the echo 62 of the fish school to be tracked as shown in FIG. 13A. After commencement of automatic tracking, the scanning sonar 50 adjusts the tilt angle δ of the ultrasonic transmitting beam 53 based on a motion vector of the own ship mark 61 and the location of the target lock mark 63 such that the center of the ultrasonic transmitting beam 53 emitted from the transducer 52 hits the exact position of the target lock mark 63. Consequently, the transducer 52 can receive the echo 62 reflected from the target fish school and the scanning sonar 50 can determine an updated location of the target fish school from echo signals returning from around the position of the target lock mark 63 and updates the on-screen position of the target lock mark 63 accordingly. The scanning sonar 50 performs its automatic tracking function by repeating such operation, whereby a past track 64 of the fish school is drawn on the screen 60 with the lapse of time as shown in FIGS. 13B and 13C.

FIG. 14 is a diagram showing how the scanning sonar 50 detects a fish school 55 with the ultrasonic transmitting beam 53 directed obliquely downward at a tilt angle δ1, in which the fish school 55 is located on the surface of the umbrellalike beam pattern above sea bottom 56. When the fish school 55 moves as shown in FIG. 15, the scanning sonar 50 tracks the fish school 55 by automatically adjusting the tilt angle δ from δ1 to δ2 so that the ultrasonic transmitting beam 53 is continuously directed toward the fish school 55.

The conventional scanning sonar having the aforementioned automatic tracking feature scans only horizontally by rotating the receiving beam 57 along the conical beam pattern. Therefore, if the aimed fish school 55 moves away from the beam pattern area at relatively a high speed, the scanning sonar will fail to continue tracking of the fish school 55. For the sake of simplicity, let us assume that the horizontal distance to and the direction of the fish school 55 remain unchanged and the fish school 55 moves only vertically. As long as the fish school 55 remains within the beamwidth of the ultrasonic transmitting beam 53, the tilt angle δ1 is not varied and the on-screen position of the tracked fish school 55 remains the same even when the fish school 55 moves vertically from the position shown in FIG. 14. If, however, the fish school 55 moves away from the ultrasonic transmitting beam 53 as shown in FIG. 16, the conventional scanning sonar would not be able to adjust the tilt angle δ of the ultrasonic transmitting beam 53 to follow the moving fish school 55 by just scanning horizontally, because the depth of the fish school 55 is unknown. As a consequence, the scanning sonar could no longer continue automatic tracking of the fish school 55 and present its blip on-screen.

SUMMARY OF THE INVENTION

The invention is intended to provide a solution to the aforementioned problem of the prior art. Accordingly, it is a first object of the invention to provide a scanning sonar which can perform automatic tracking of a target in a reliable fashion by precisely controlling tilt angle of a sounding beam in accordance with target movements.

It is a second object of the invention to provide a scanning sonar which can automatically track bottom fish existing close to the bottom by distinctly separating a fish echo from a bottom echo, thereby avoiding undesired tracking of the bottom echo.

It is a third object of the invention to provide a scanning sonar which can automatically recommence tracking of a target upon receiving its echo even when ordinary automatic tracking of the target echo has been temporarily interrupted by aeration, for instance.

To achieve the aforementioned first object, an automatically tracking scanning sonar of the invention performs vertical scanning in addition to horizontal scanning. In the horizontal scanning, the scanning sonar emits an ultrasonic beam in all directions underwater, forming an umbrellalike beam pattern directed obliquely downward with a specific tilt angle from water surface, and detects an echo signal from a target existing on the surface of the umbrellalike beam pattern. In the vertical scanning, the scanning sonar emits an ultrasonic beam having a specific sector angle in a vertical plane directed in a specific horizontal direction and detects an echo signal from a target existing in the vertical plane. It is possible to determine the depth of the target from the echo signal detected by the vertical scanning. Even when the target moves vertically, the tilt angle of the umbrellalike beam pattern for the horizontal scanning can be varied to follow the target by controlling the tilt angle based on target depth information. The scanning sonar thus constructed can perform automatic tracking of the target in a reliable fashion regardless of vertical movements of the target.

According to the invention, the scanning sonar may perform the horizontal and vertical scanning alternately or simultaneously. If the horizontal and vertical scanning are performed alternately, it is possible to prevent crosstalk of the echo signals obtained in horizontal and vertical scanning modes. If the horizontal and vertical scanning are performed simultaneously, it is possible to improve response in controlling the tilt angle.

To achieve the aforementioned second object, the automatically tracking scanning sonar of the invention discriminates the echo signal received from the target from an echo signal received from the bottom of water among echo signals detected by the horizontal and vertical scanning, calculates a predicted target position based on the echo signal received from the target, and performs automatic tracking based on the predicted target position. As a result, even when a fish school exists close to the bottom and an echo of the fish school lies immediately close to or adjoins an echo of the bottom, the scanning sonar can discriminate and track the fish school without incorrectly tracking the bottom.

It is possible to discriminate between the echo signal from the bottom and the echo signal from the fish school by setting a threshold. Specifically, the echo signal is judged to be received from the bottom when its level exceeds the threshold, whereas the echo signal is judged to be received from the target when its level is equal to or lower than the threshold. The threshold for the echo signal obtained by the horizontal scanning is set for average values of signal levels taken at individual horizontal distances along the circumferential direction, whereas the threshold for the echo signal obtained by the vertical scanning is set for average values of signal levels taken at individual depths along the direction of horizontal distance.

To achieve the aforementioned third object, the automatically tracking scanning sonar of the invention is constructed such that, when it becomes impossible to execute ordinary automatic tracking operation due to loss of the echo signal from the target, the scanning sonar continues automatic tracking based on an imaginary target position, and when the echo signal from the target is normally detected again, the scanning sonar resumes the ordinary automatic tracking operation. In a situation where the echo of the target is not received due to aeration or when the target has moved to just beneath own ship on which the scanning sonar is installed, the scanning sonar will not be able to continue the ordinary automatic tracking operation. In such a case, the scanning sonar continues automatic tracking based on the imaginary target position and resumes the ordinary automatic tracking operation when the echo of the target is normally detected again. Therefore, it is not necessary to switch off an automatic tracking function and reenter a target lock mark in such a situation in the scanning sonar of the invention, resulting in eventual labor savings.

In one feature of the invention, if own ship has moved during a period when the echo signal from the target is not received, the predicted target position is corrected against a moving distance of own ship. This makes it possible to track the target based on the imaginary target position with higher accuracy. In another feature of the invention, a mark indicating the target position is displayed in a different appearance when it becomes impossible to execute the ordinary automatic tracking operation as compared with a situation where the ordinary automatic tracking operation is executed. This makes it possible to alert an operator that automatic tracking is being performed using the imaginary target position.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
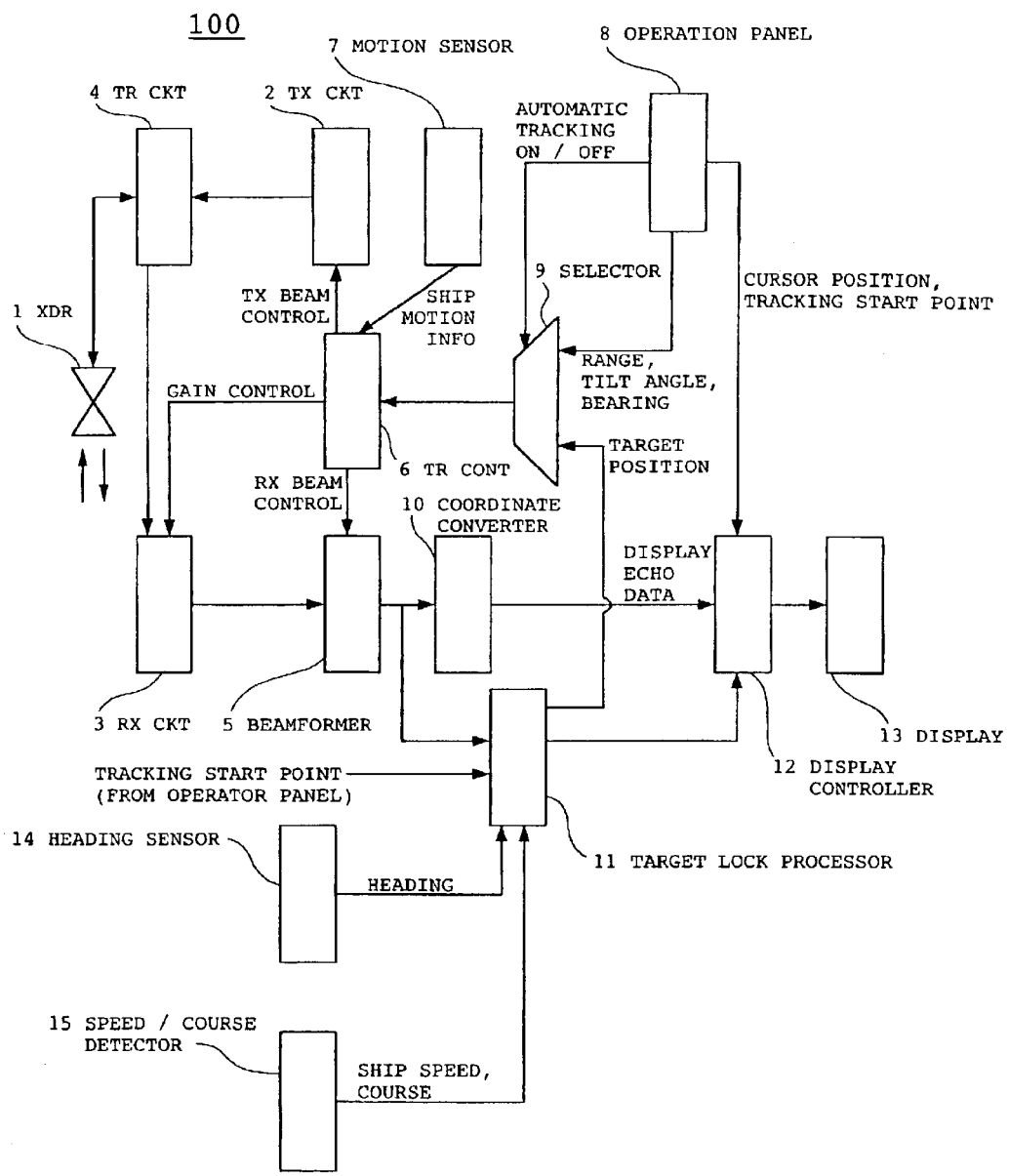
FIG. 1 is a block diagram of an automatically tracking scanning sonar according to a preferred embodiment of the invention.
Figure 5A:
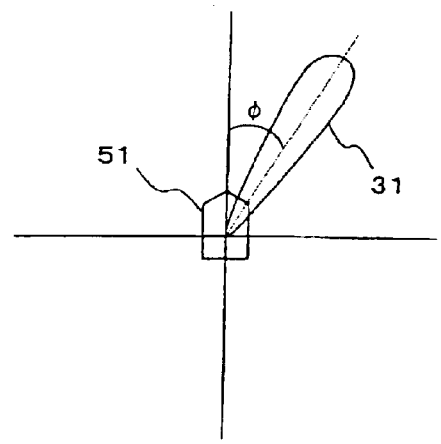
FIGS. 5A and 5B are diagrams illustrating a pattern of beamforming in vertical scanning mode.
Figure 5B:
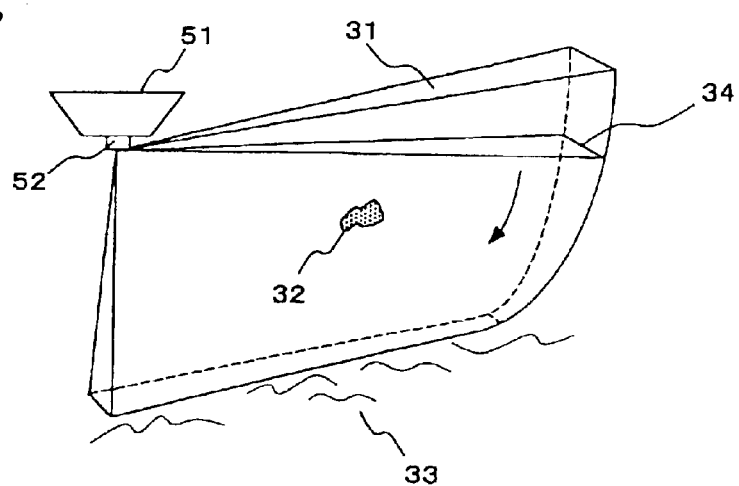
Figure 12:
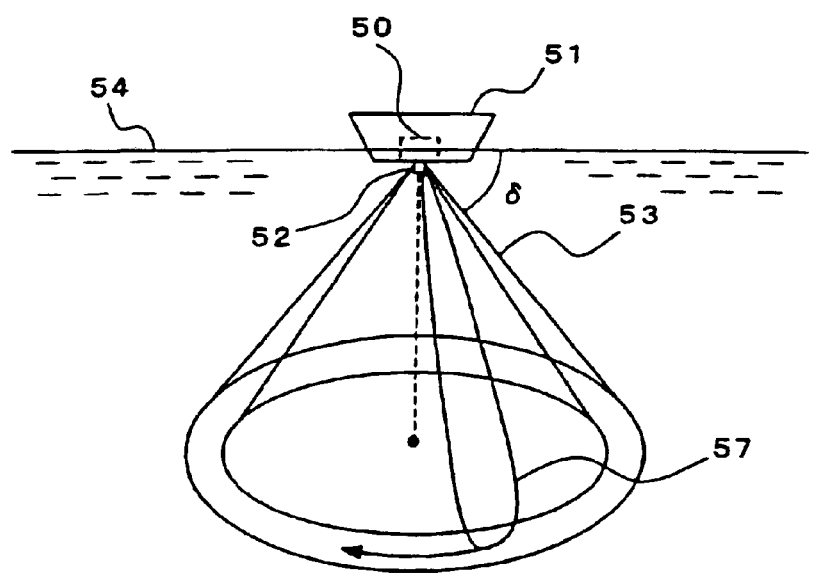
FIG. 12 is a diagram showing a general principle of the scanning sonar.
Figure 13A:
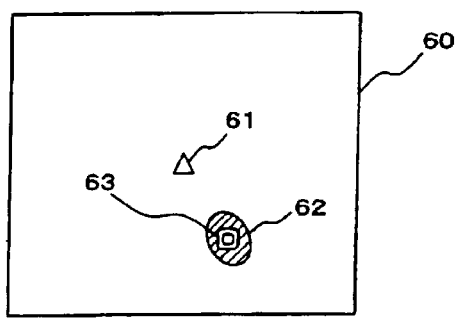
FIGS. 13A–13C are diagrams showing examples of on-screen pictures presented by the automatically tracking scanning sonar.
Figure 13B:
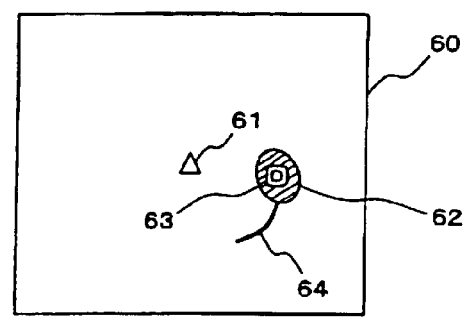
Figure 13C:
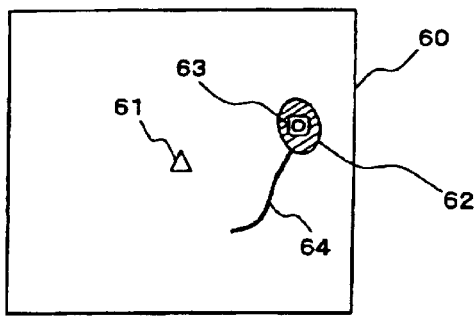
Figure 14:
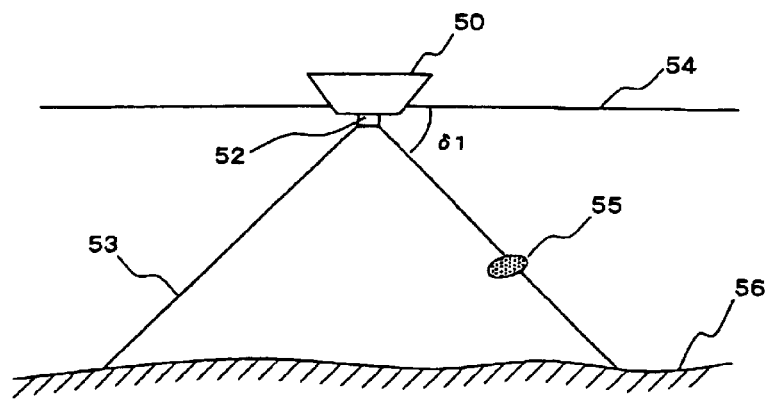
FIG. 14 is a diagram showing how the scanning sonar detects a fish school.
Figure 15:
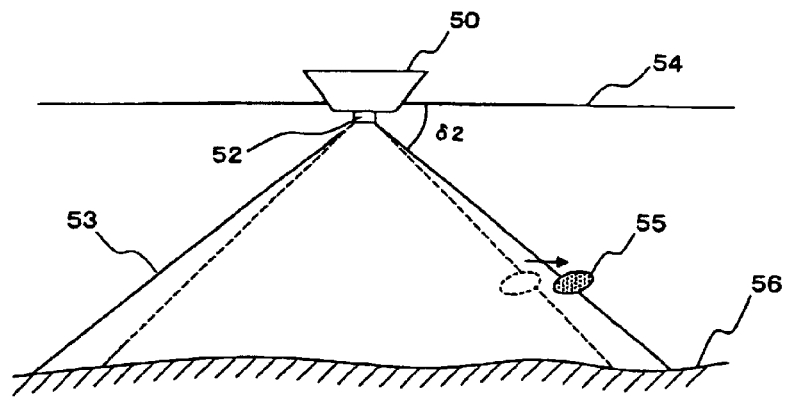
FIG. 15 is a diagram showing how the scanning sonar automatically tracks the fish school.
Figure 16:
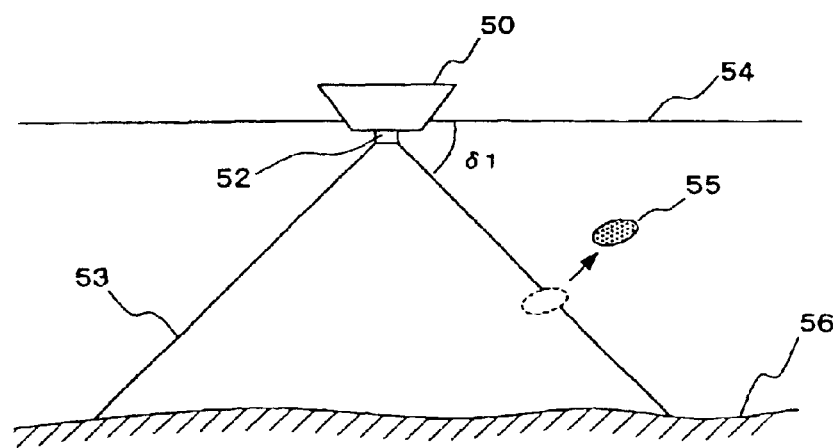
FIG. 16 is a diagram showing a situation in which the fish school moves away from a sounding beam.

FIG. 1 is a block diagram of an automatically tracking scanning sonar 100 according to a preferred embodiment of the invention, in which designated by the numeral 1 is a transducer which emits a ping of ultrasonic waves underwater every transmission cycle by converting an electric transmitting signal, receives echo signals returning from underwater targets and coverts the received echo signals into an electric signal every receiving cycle. The transducer 1 includes a number of transducer elements arranged in a cylindrical shape, although the transducer 1 may be of other shapes, such as a sphere. Designated by the numeral 2 is a transmitter circuit which outputs a transmitting signal for emitting an ultrasonic transmitting beam 53 in all directions around the transducer 1, forming an umbrellalike beam pattern directed obliquely downward with a specific tilt angle δ as shown in FIG. 12, in horizontal scanning mode. In vertical scanning mode, on the other hand, the transmitter circuit 2 outputs a transmitting signal for emitting an ultrasonic transmitting beam 31 having a specific sector angle in a vertical plane directed in a specific horizontal direction φ as shown in FIGS. 5A and 5B, in which designated by the numeral 32 is a fish school and designated by the numeral 33 is a bottom of water. Referring again to FIG. 1, designated by the numeral 3 is a receiver circuit which amplifies the received signal fed from the transducer 1 with a specified gain and takes out desired frequency components of the signal by means of a filter, and designated by the numeral 4 is a transmit-receive (TR) circuit for switching signal paths between transmit and receive cycles such that the output signal of the transmitter circuit 2 is delivered to the transducer 1 every transmission cycle and the received signal from the transducer 1 is sent to the receiver circuit 3 every receiving cycle.

A beamformer 5 forms a receiving beam 57 which is steered all around the transducer 1 at the same tilt angle δ as shown in FIG. 12 every receiving cycle in the horizontal scanning mode. In the vertical scanning mode, the beamformer 5 forms a receiving beam 34 which is directed in the specific horizontal direction φ as shown in FIG. 5A and successively steered downward from the horizontal plane (water surface) as shown by an arrow in FIG. 5B. Echo signals picked up by these receiving beams 34, 57 are envelope-detected and output from the beamformer 5 as echo signal intensity data formatted for a polar coordinate system. A transmit-receive controller 6 controls the transmitting beam 53 (31) and the receiving beam 57 (34) according to range, tilt angle and sounding direction settings in the horizontal and vertical scanning modes, respectively, as well as the gain of the receiver circuit 3. A motion sensor 7 detects the angle and direction of inclination of a ship 51 and transmits ship motion information to the transmit-receive controller 6, which stabilizes the tilt angle of the transmitting beam 53 (31) and the receiving beam 57 (34) against the motion the ship 51. It is to be noted that the motion sensor 7 does not constitute an essential part of the invention.

An operator panel 8 incorporates various keys and rotary controls which are operated by an operator to obtain a desired image of target echoes on a display 13. The operator sets such parameters as range, tilt angle for the horizontal scanning mode, sounding direction for the vertical scanning mode, ON or OFF state of automatic tracking, and automatic tracking start point through the operator panel 8. Designated by the numeral 9 is a selector which selectively outputs the range, tilt angle and sounding direction set on the operator panel 8 in the automatic tracking OFF state, the range, tilt angle and sounding direction determined according to predicted target position information in the automatic tracking ON state. A coordinate converter 10 converts the received echo data formatted for the polar coordinate system output from the beamformer 5 into echo image data formatted for a Cartesian coordinate system suited for an ordinary display device, such as a cathode ray tube (CRT) or a liquid crystal display (LCD). Designated by the numeral 11 is a target lock processor which determines the position of a specified target based on the received echo data obtained from the beamformer 5 and automatically tracks the pertinent target. The target lock processor 11 constitutes a discriminator and a predicted target position calculator mentioned in the appended claims of the invention.

Designated by the numeral 12 is a display controller which synthesizes the echo image data obtained from the coordinate converter 10 with image data including text and marks generated from the target position information and target speed information fed from the target lock processor 11 as well as cursor information fed from the operator panel 8 and converts synthesized image data into a video signal. The display 13 formed of a CRT or an LCD presents an image of target echoes together with the text and marks based on the video signal fed from the display controller 12. Designated by the numeral 14 is a heading sensor, such as a global positioning system (GPS) gyro or a compass, for detecting the heading of the ship 51. Designated by the numeral 15 is a speed/course detector including, for example, a navigation system and a speed sensor for detecting a speed vector (speed and course) of the ship 51.

Figure 2:
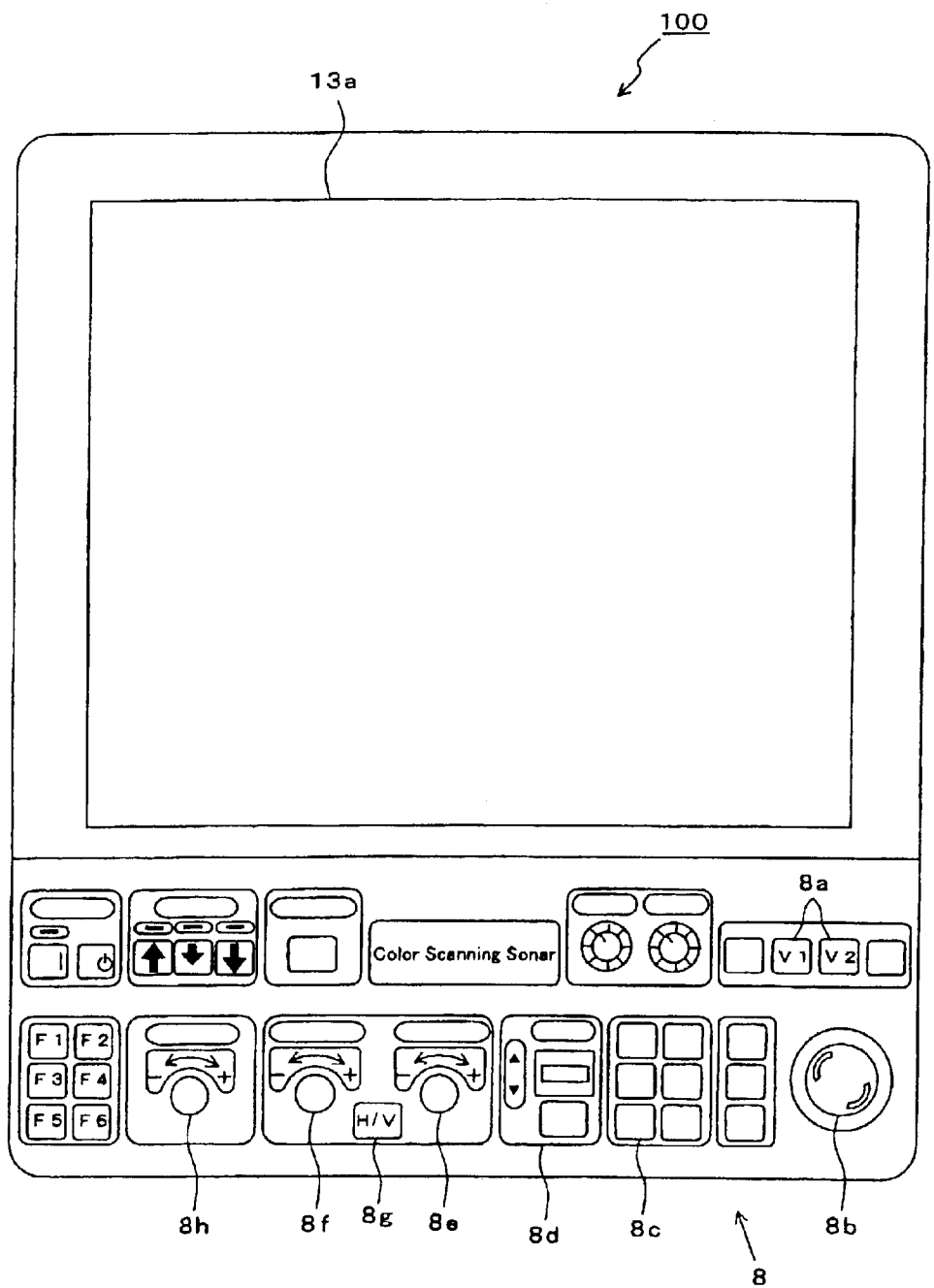
FIG. 2 is a front view of a main unit of the scanning sonar.

FIG. 2 is a front view of a main unit of the automatically tracking scanning sonar 100, in which designated by the numeral 8 is the aforementioned operator panel, and designated by the numeral 13a is a display screen of the display 13. Provided on the operator panel 8 are direction keys 8a for setting the sounding direction in the vertical scanning mode, a finger-operated trackball 8b for moving a cursor on-screen, a target lock key 8c which should be pushed when initiating automatic tracking, a tilt angle keypad 8d for automatically or manually setting the tilt angle in the horizontal scanning mode, a gain control 8e for adjusting the gain, a range switch 8f for selecting a desired range scale, a scanning mode key 8g for selecting whether to use the horizontal or vertical scanning mode when setting the range and gain, and a fishing type key 8h for specifying the type of fishing operation. Although there are provided various other keys and controls on the operator panel 8, they are not described here because the invention is not directly concerned with those keys and controls.

Figure 3:
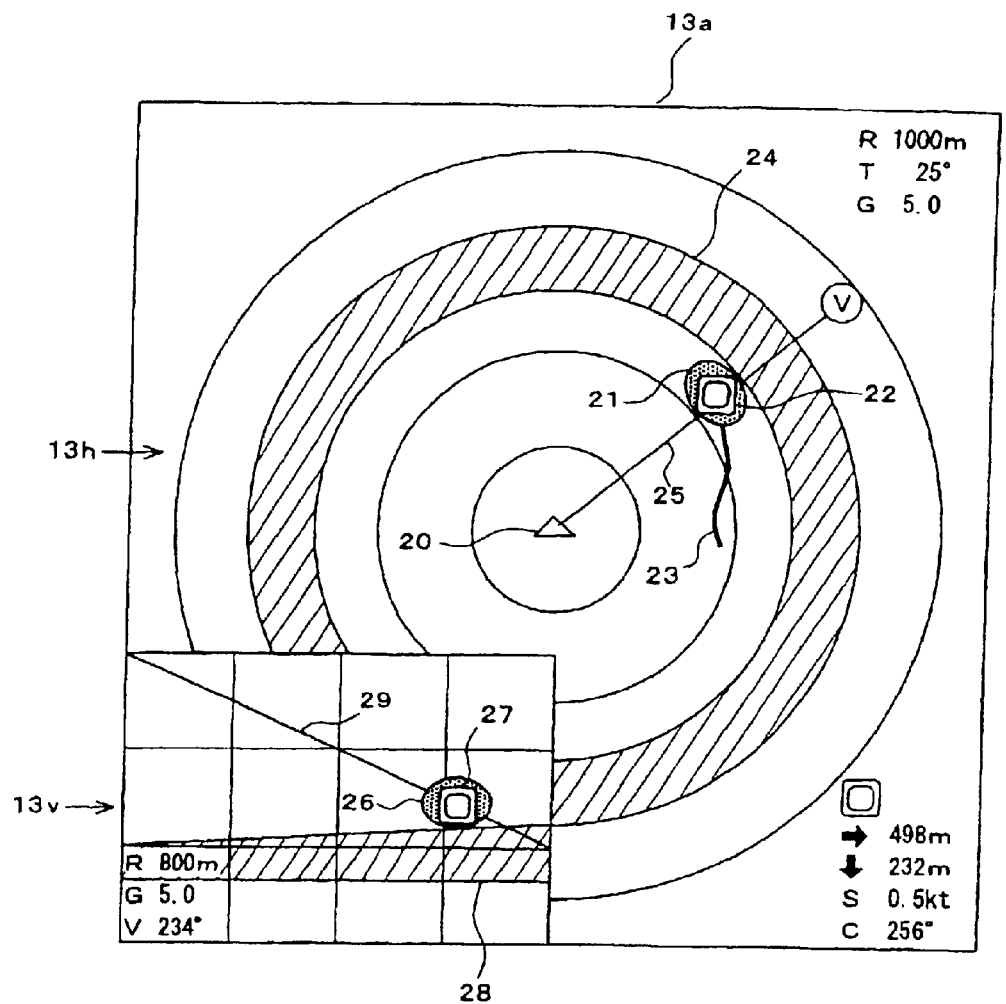
FIG. 3 shows an example of a picture presented on a display screen during automatic tracking.

FIG. 3 shows an example of a picture presented on the display screen 13a during automatic tracking. This picture includes a horizontal scan image 13h and a vertical scan image 13v arranged together on the same display screen 13a. The horizontal scan image 13h is a representation of target echoes obtained in the horizontal scanning mode as illustrated in FIG. 12, in which designated by the numeral 20 is an own ship mark indicating the position of the ship 51, designated by the numeral 21 is an echo of a fish school, designated by the numeral 22 is a target lock mark indicating the position of a specified target, designated by the numeral 23 is a past track of the echo 21 chosen as the target, designated by the numeral 24 is an echo of the bottom, and designated by the numeral 25 is a bearing marker showing the sounding direction for vertical scanning. Shown at the upper-right corner of the display screen 13a are a range in use (R: 1000 m), tilt angle (T: 25°) and gain (G: 5.0) for horizontal scanning. Also, shown at the lower-right corner of the display screen 13a are a rightward-pointing arrow indicating the horizontal distance (498 m) to the target, a downward-pointing arrow indicating the depth (232 m) of the target, moving speed (0.5 knots) of the target, and the direction of movement (C: 256°) of the target.

The vertical scan image 13v is a representation of target echoes obtained in the vertical scanning mode as illustrated in FIG. 5 from the sounding direction shown by the bearing marker 25 in the horizontal scan image 13h. In the example of FIG. 3, designated by the numeral 26 is an echo of the fish school, designated by the numeral 27 is a target lock mark, designated by the numeral 28 is an echo of the bottom, and designated by the numeral 29 is a tilt mark indicating the tilt angle to the specified target. Shown at the lower-left corner of the display screen 13a are a range in use for vertical scanning (R: 800 m), gain (G: 5.0) for vertical scanning, and the sounding direction (V: 234°) for vertical scanning indicated by the bearing marker 25.

Automatic tracking operation performed by the automatically tracking scanning sonar 100 thus constructed is now described in detail. First, the operator aligns the cursor with the fish school to be automatically tracked by operating the trackball 8b while watching fish echoes presented on the display screen 13a shown in FIG. 2, and then hits the target lock key 8c. As a result, the target lock mark 22 is placed on the echo 21 of the fish school and automatic tracking begins.

Figure 4:
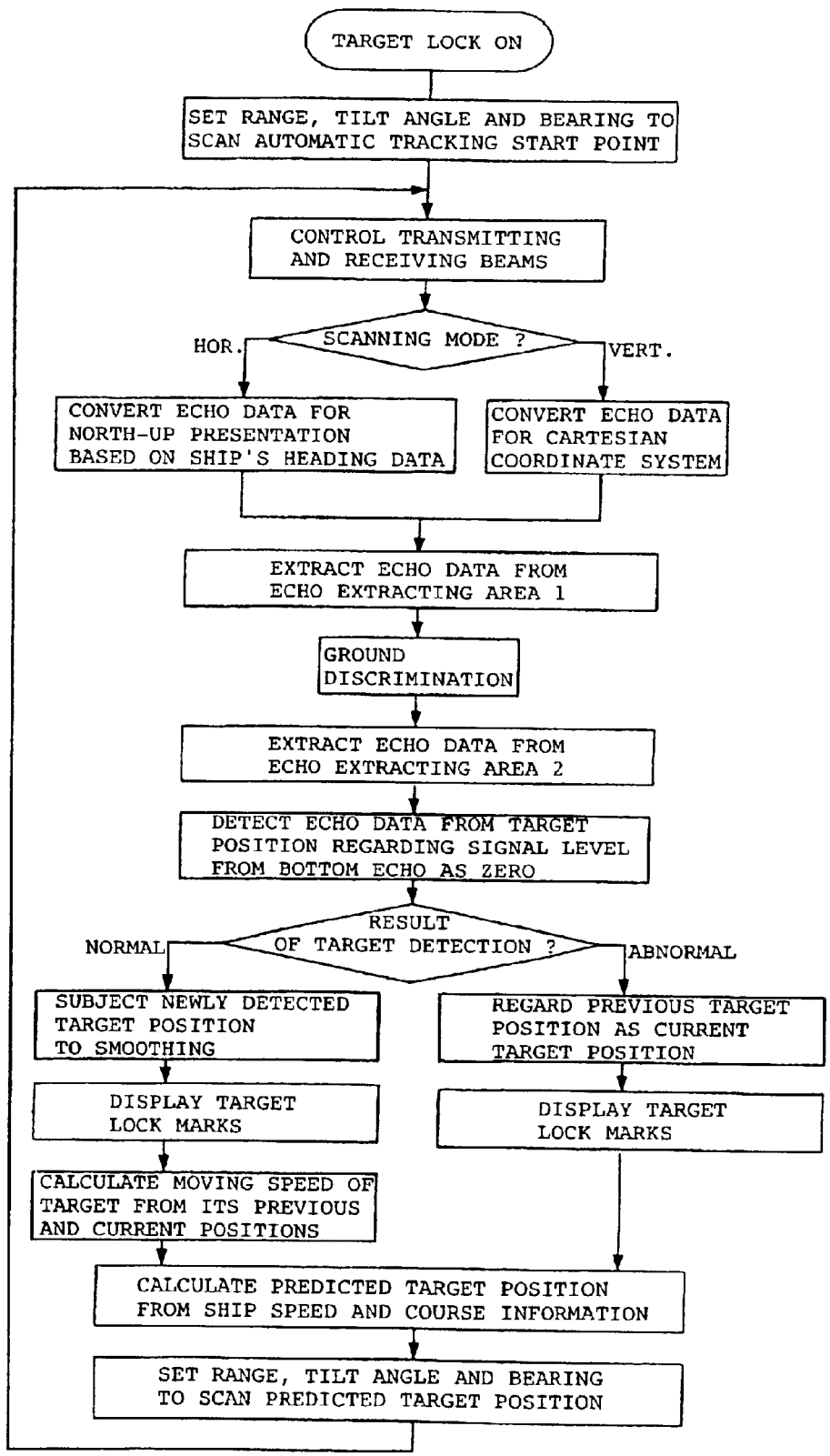
FIG. 4 is a flowchart showing an operating procedure for executing automatic tracking operation.

FIG. 4 is a flowchart showing an operating procedure for executing the automatic tracking operation. Steps 1 and 17 are performed by the selector 9 while steps 3 to 16 are a routine carried out by the target lock processor 11. Referring to FIG. 1, when an automatic tracking ON signal is entered from the operator panel 8 to the selector 9, the selector 9 sets the range, tilt angle and bearing (sounding direction) and transmits such pieces of information to the transmit-receive controller 6 such that the automatic tracking start point specified by the target lock mark 22 can be scanned (step S1). Upon receiving this information, the transmit-receive controller 6 controls the transmitter circuit 2 and the beamformer 5 so that the transmitting beams 31, 53 and the receiving beams 34, 57 are correctly directed to the specified tilt angle and/or sounding direction. As a result, the transmitting beams 31, 53 are emitted toward the specified target and the receiving beams 34, 57 receive an echo from the target (step S2). In this embodiment, transmit and receive cycles are alternately performed in the horizontal scanning mode (FIG. 12) and the vertical scanning mode (FIG. 5). More specifically, if horizontal scanning is made in step S2 in the current transmit-receive cycle, vertical scanning is made in step S2 in a succeeding transmit-receive cycle. To execute this alternate scanning operation, a judgment is made in step S3 to determine whether to perform horizontal scanning or vertical scanning.

Figure 6:
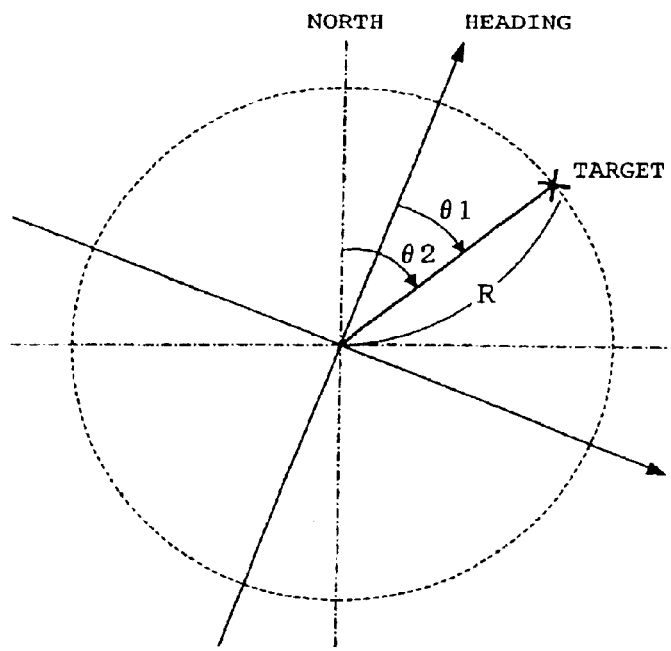
FIG. 6 is a diagram showing how echo data is formatted in a polar coordinate system in horizontal scanning mode.
Figure 7:
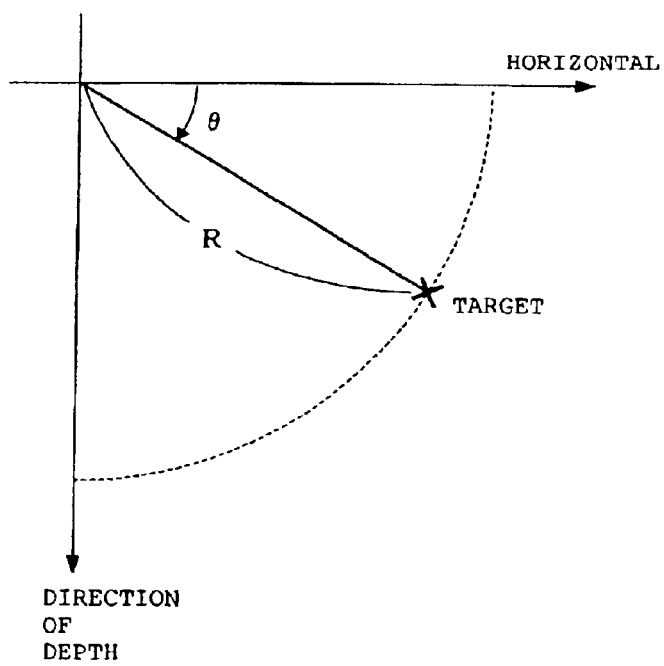
FIG. 7 is a diagram showing how echo data is formatted in a polar coordinate system in the vertical scanning mode.

If the current scanning mode is horizontal in step S3, the echo data is converted such that the orientation of the resultant horizontal scan image 13h is referenced to north (north-up presentation) based on ship's heading data (step S4). More specifically, since the echo data output from the beamformer 5 in the horizontal scanning mode is formatted for a polar coordinate system referenced to the ship's heading (head-up presentation), the echo data is reformatted for a polar coordinate system referenced to north by substituting θ2 for θ1 as shown in FIG. 6. If the current scanning mode is vertical in step S3, on the other hand, the echo data is converted for a Cartesian coordinate system (step S5). Specifically, since the echo data output from the beamformer 5 in the vertical scanning mode is obtained by vertically scanning a specific sector area from a horizontal direction (water surface) downward as shown in FIG. 7, the echo data is originally formatted for a polar coordinate system. The echo data is therefore reformatted for the Cartesian coordinate system in step S5.

Figures 8A, 8B, 8C:
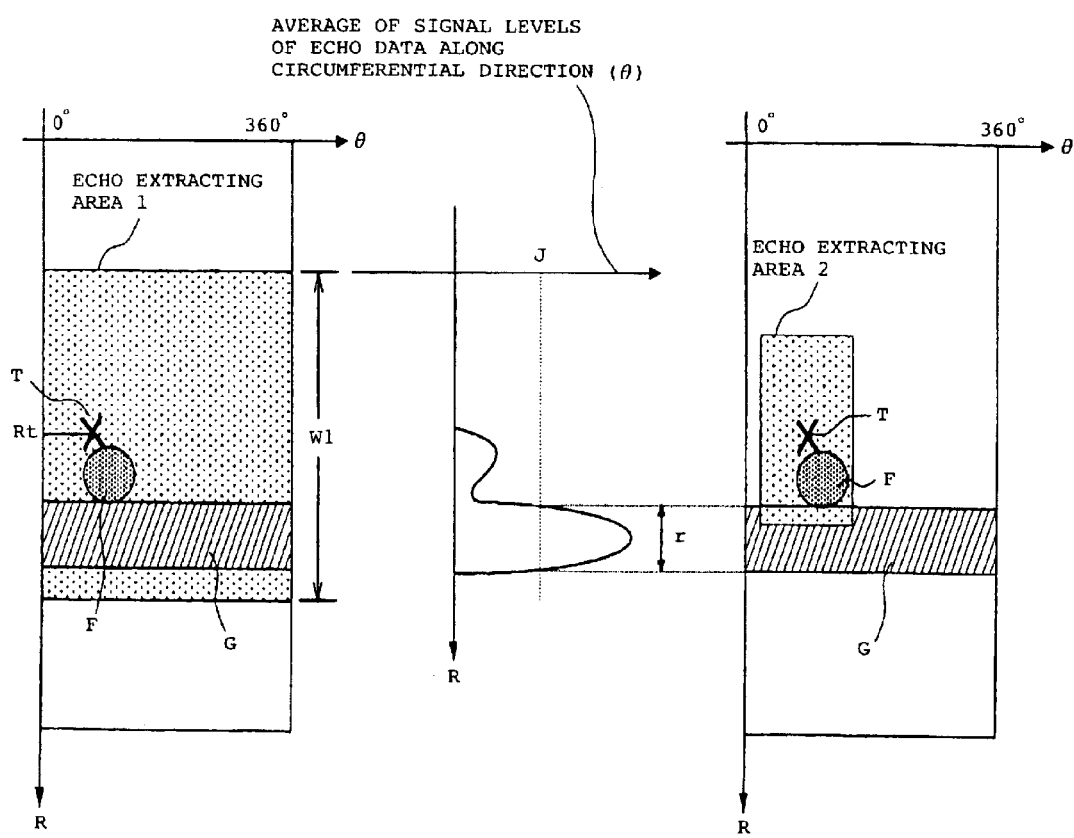
FIGS. 8A–8C are diagrams showing how echo data is extracted in the horizontal scanning mode.

Next, an echo of the intended target is extracted from the echo data converted as described above. First, echo data is extracted from a preset echo extracting area 1 which is described later (step S6). In the horizontal scanning mode, the echo data is formatted for the polar coordinate system, as illustrated in FIG. 8A, where R is range (horizontal distance) and θ is bearing (sounding direction). The echo data is extracted from the echo extracting area 1 having a specific width W1 containing a point of range Rt at which a previous target position T was located. While the echo data is extracted from all directions in azimuth (θ=0° to 360°) in the illustrated example, the echo data may be extracted from only a sector area of a specific angular width. When steps 2 to 15 are first executed, the previous target position T corresponds to the position where the target lock mark 22 was entered. When steps 2 to 15 are executed the second time and onward, however, the previous target position T corresponds to a position predicted by calculation in step S16 which is described later.

Figures 9A, 9B, 9C:
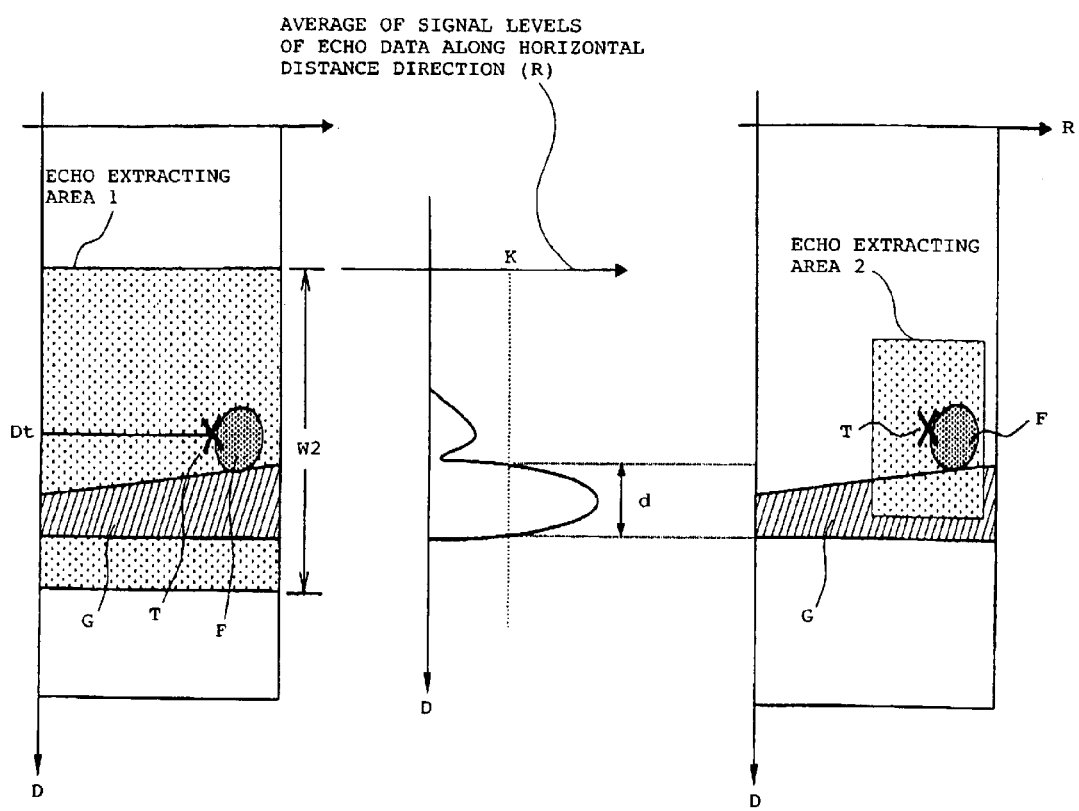
FIGS. 9A–9C are diagrams showing how echo data is extracted in the vertical scanning mode.

In the vertical scanning mode, on the other hand, the echo data is formatted for the Cartesian coordinate system as shown in FIG. 9A, where R is horizontal distance and D is depth. The echo data is extracted from the echo extracting area 1 having a specific width W2 containing a point of depth Dt of the previous target position T. While the echo data is extracted from all horizontal distances, the echo data may be extracted from only a set range of horizontal distance centering on the horizontal distance of the previous target position T. Again, the previous target position T corresponds to the position where the target lock mark 22 was entered when steps 2 to 15 are first executed, and the previous target position T corresponds to a position predicted by calculation in the later-described step S16 when steps 2 to 15 are executed the second time and onward.

Next, a ground discriminating process is performed based on the echo data extracted as described above (step S7). The echo data represents levels of echo signals. In the horizontal scanning mode, average values of the signal levels of the echo data within the echo extracting area 1 of FIG. 8A are calculated at individual horizontal distances R along the circumferential direction (θ=0° to 360°). Since the bottom echo 24 appears in generally a doughnut-shaped pattern when presented in the Cartesian coordinate system as shown in FIG. 3, it forms a beltlike pattern (bottom echo G) having a specific width in the direction of the horizontal distance R when presented in the R–θ polar coordinate system as shown in FIG. 8A. The average values of the signal levels of the echo data within the echo extracting area 1 calculated along the circumferential direction are extremely large in a region where the bottom echo G is present and are relatively small in a region where a fish echo F is present as shown in FIG. 8B. It is therefore possible to clearly discriminate the bottom echo G and the fish echo F from each other by setting a specific threshold J for the average value of the signal levels taken along the circumferential direction and regarding an echo existing in a distance range r where the average value of the signal levels exceeds the threshold J as the bottom echo G.

In the vertical scanning mode, average values of the signal levels of the echo data within the echo extracting area 1 of FIG. 9A are calculated at individual depths D along the direction of the horizontal distance R. Since the bottom echo 28 appears in generally a beltlike pattern when presented in the Cartesian coordinate system as shown in FIG. 3, it also forms a beltlike pattern (bottom echo G) as shown in FIG. 9A. The average values of the signal levels of the echo data within the echo extracting area 1 calculated along the horizontal direction R are extremely large in a region where the bottom echo G is present and are relatively small in a region where a fish echo F is present as shown in FIG. 9B. It is therefore possible to clearly discriminate the bottom echo G and the fish echo F from each other by setting a specific threshold K for the average value of the signal levels taken along the direction of the horizontal distance R and regarding an echo existing in a depth range r where the average value of the signal levels exceeds the threshold K as the bottom echo G.

Next, echo data is extracted from an echo extracting area 2 (step S8). As illustrated in FIGS. 8C and 9C, the echo extracting area 2 which is centered around the target position T is set to a narrower area than the echo extracting area 1. The echo data extracted from this echo extracting area 2 includes data of the fish echo F and part of data of the bottom echo G. As the echo data is now extracted from the limited echo extracting area 2, it is possible to reduce data processing time.

Then, regarding the signal level from the bottom echo G as zero, echo data from only the fish echo F is detected (step S9). Specifically, among the echo data extracted from the echo extracting area 2, values of echo data which have been judged to be the bottom echo G in step S7 are forcibly zeroed in order to exclude the data of the bottom echo G. Samples of which signal levels are equal to or larger than a specific threshold are taken out from the remaining part of the echo data. Continuity of the signal levels of adjacent samples are examined and samples having the continuity are assembled in a group. Should there exist more than one group, locations of the centers of gravity of individual groups are determined and the group of samples whose center of gravity is nearest to the target position T is judged to be an echo of a tracked target. The center of gravity of the group thus determined is chosen as a newly detected target position. As can be seen from FIGS. 8A–8C, the target position T is defined by the direction θ of the target and the distance R to the target in the horizontal scanning mode. As can be seen from FIGS. 9A–9C, the target position T is defined by the horizontal distance R to the target and the depth D of the target in the vertical scanning mode.

Subsequently, a judgment is made to determine whether the tracked target has been correctly detected (step S10). When the new target position has been correctly detected as explained above, a mathematical operation for smoothing the newly detected target position is performed (step S11). Specifically, a point obtained by interpolating between the previous target position T and the target position newly detected in step S9 is regarded as a current target position T.

Figure 10:
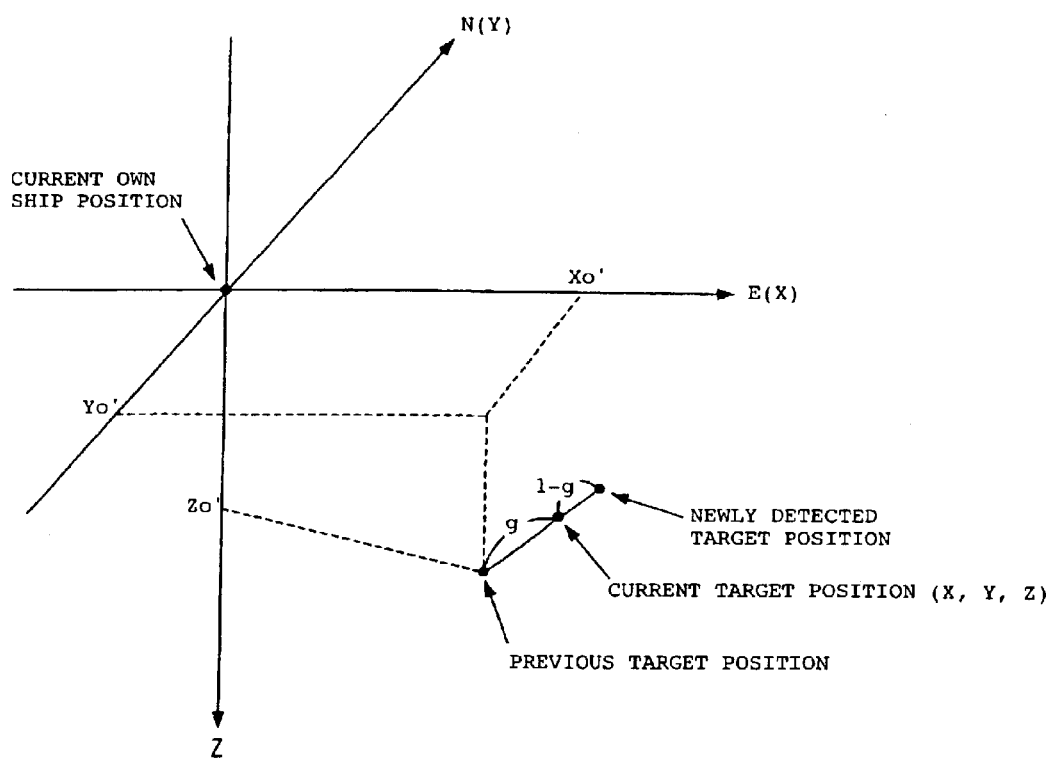
FIG. 10 is a diagram illustrating smoothing of target positions.

FIG. 10 is a diagram illustrating how target positions are smoothed by interpolation. In the horizontal scanning mode, the target position (X, Y, Z) is calculated as follows:

$$X = g \cdot r \cdot \cos\alpha \cdot \cos(p/2-\theta) + (1-g) \cdot X_0'$$
$$Y = g \cdot r \cdot \cos\alpha \cdot \sin(p/2-\theta) + (1-g) \cdot Y_0'$$
$$Z = g \cdot r \cdot \sin\alpha + (1-g) \cdot Z_0' \quad (1)$$

where α is tilt angle, g is interpolating ratio, θ is the direction of the target, and r is the distance to the target.

In the vertical scanning mode, the target position (X, Y, Z) is calculated as follows:

$$X = g \cdot r \cdot \cos(p/2-\beta) + (1-g) \cdot X_0'$$
$$Y = g \cdot r \cdot \sin(p/2-\beta) + (1-g) \cdot Y_0'$$
$$Z = g \cdot d + (1-g) \cdot Z_0' \quad (2)$$

where β is bearing (sounding direction), g is interpolating ratio, r is the horizontal distance to the target, and d is the depth of the target.

A reason why the target positions are smoothed by interpolation is as follows. The amount of displacement of the newly detected target position from the previous target position might be too large and erratic. Therefore, if the target position T is updated directly to the newly detected target position, the plotted target positions, or the track 23 of the target, displayed on the display screen 13a could form an irregular zigzag line. If the current target position is obtained by interpolating between the previous target position and the newly detected target position as illustrated in FIG. 10, the amount of displacement of the current target position from the previous target position would be reduced, resulting in a reduction in the degree of irregularities of the plotted target positions and improved visibility. The degree of smoothing effect is determined by the aforementioned interpolating ratio g. The smaller the interpolating ratio g, the larger the smoothing effect, resulting in stabilized target plotting. The larger the interpolating ratio g, the smaller the smoothing effect, resulting in increased irregularities.

When the current target position has been calculated as described above, the target lock marks 22, 27 are displayed at the calculated position on the display screen 13a, updating their initially entered position (step S12). The plotted track 23 of the target is also updated accordingly. Subsequently, moving speed of the target is calculated based on the current target position (step S13). This moving speed can be calculated by dividing the distance between coordinates of the current target position and coordinates of a target position T seconds before by the elapsed time T.

Figure 18:
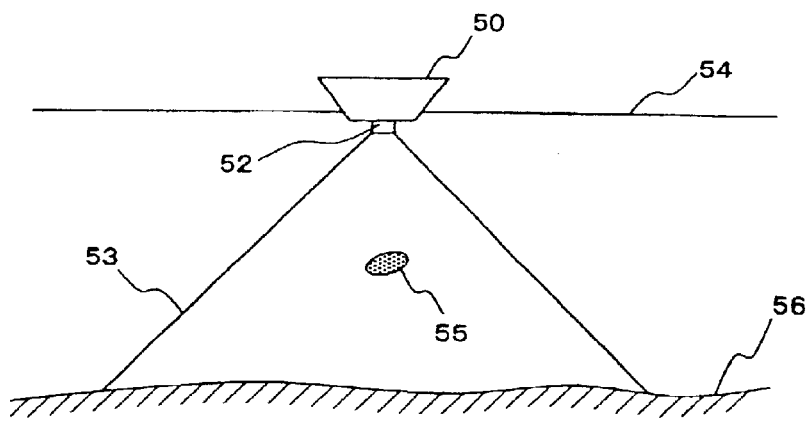
FIG. 18 is a diagram showing a situation in which the fish school has moved to just beneath own ship.

The tracked target may not be, for one reason or another, correctly detected in step S10. This situation would happen when the echo of the target is not received due to aeration or when the target has moved to just beneath the ship 51 as shown in FIG. 18 and could not be sounded by the umbrellalike pattern of the ultrasonic transmitting beam 53. In such a case, the previous target position is used again as the current target position (step S14). Then, the target lock marks 22, 27 are displayed at points corresponding to this imaginary current target position (step S15) and automatic tracking is continued using the current target position. The target lock marks 22, 27 displayed in such a "target loss" situation are different in appearance from the ordinary target lock marks 22, 27. For example, the target lock marks 22, 27 are displayed in different colors or reduced brightness, or caused to blink. This makes it possible to alert the operator that automatic tracking is being performed using the imaginary current target position.

Figure 11:
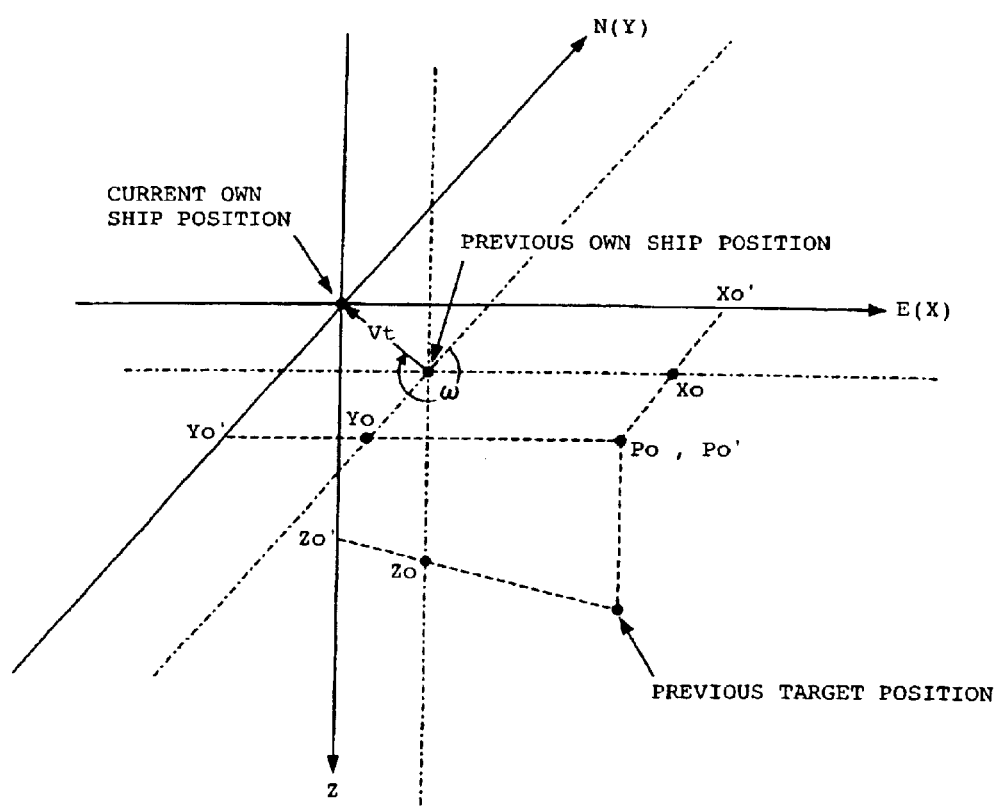
FIG. 11 is a diagram illustrating correction of a target position.

Upon completion of step S13 or step S15, the target lock processor 11 calculates a predicted target position in step S16 from the speed and course of the ship 51 detected by the speed/course detector 15. There is a specific time interval between a point in time when the previous target position was detected by a preceding transmit-receive cycle and a point in time when a current transmit-receive cycle is executed. If the ship 51 moves during this time interval, a reference point for measuring the range and bearing of the target varies. The predicted target position is therefore corrected against the movement of the ship 51 in a manner described below, so that the transmitting beams 31, 53 are emitted exactly toward the target. Referring to FIG. 11 showing a Cartesian coordinate system whose three axes represent north (N), east (E) and depth (Z), a point $P_0(X_0, Y_0, Z_0)$ shows the previous target position detected at a previous own ship position which corresponds to the origin of the Cartesian coordinate system. Expressing the elapsed time from the preceding transmit-receive cycle to the latest transmit-receive cycle by t, the speed of the ship 51 during this time interval by V, and the course of the ship 51 referenced to true north by ω, the previous target position as viewed from the current own ship position, or point $P_0'(X_0',$ $Y_0'$, $Z_0'$) as expressed below, is regarded as the predicted target position:

$$X_0'=X_0-V \cdot t \cdot \cos(p/2-\omega)$$

$$Y_0'=Y_0-V \cdot t \cdot \sin(p/2-\omega)$$

$$Z_0'=Z_0 \qquad (3)$$

The target lock processor 11 calculates the predicted target position as described above. Upon receiving information on the predicted target position, the selector 9 sets the range, tilt angle and bearing (sounding direction) of the predicted target position such that the target is correctly scanned and sends such pieces of information to the transmit-receive controller 6 (step S17). Upon receiving these pieces of information, the transmit-receive controller 6 controls the transmitter circuit 2 and the beamformer 5 so that the transmitting beams 31, 53 and the receiving beams 34, 57 are directed to the specified tilt angle and/or sounding direction. Then, a next transmit-receive cycle takes place, in which the transducer 1 emits the transmitting beams 31, 53 and the receiving beams 34, 57 receive an echo from the target (step S2). Operations performed in steps S2 and onward are the same as already described. Steps S2 to S15 are repeatedly executed in each successive transmit-receive cycle until the aforementioned automatic tracking function is switched off. In step S14, the automatic tracking operation is performed by regarding the predicted target position obtained in step S16 as the imaginary current target position. When an echo of the target has been received and the current target position has been normally detected in steps S6 to S9, the target lock processor 11 proceeds to step S11 to revert to the ordinary automatic tracking operation.

Since the scanning sonar 100 of the present embodiment operates alternately in the horizontal scanning mode and the vertical scanning mode, it can produce not only the predicted target position (range, bearing) for the horizontal scanning mode but also the predicted target position (range, depth) for the vertical scanning mode. Specifically, because target depth information is obtained from echo signals in the vertical scanning mode, it is possible to adjust, based on the target depth information, the tilt angle for a succeeding horizontal scan cycle to an optimum angle which enables continued automatic tracking. As a result, the tilt angle can be varied to follow the target even when it moves vertically, enabling the scanning sonar 100 to perform the automatic tracking operation in a reliable fashion. The above-described automatically tracking scanning sonar 100 is provided with an automatic beam direction control function which makes it possible to control the direction of the ultrasonic transmitting beam 31 so that it is correctly directed to the target in the vertical scanning mode. While two independent horizontal directions φ (producing two transmitting beams 31) for vertical scanning can be manually set by the direction keys 8a (FIG. 2), one of the two horizontal directions ω is controlled by the automatic beam direction control function such that one transmitting beam 31 automatically follows the target during the automatic tracking operation. The scanning sonar 100 of the embodiment is also provided with an automatic tilt control function for automatically varying the tilt angle according to the movement of the ship 51 as well as an automatic range control function for automatically switching the range scale.

Figure 17:
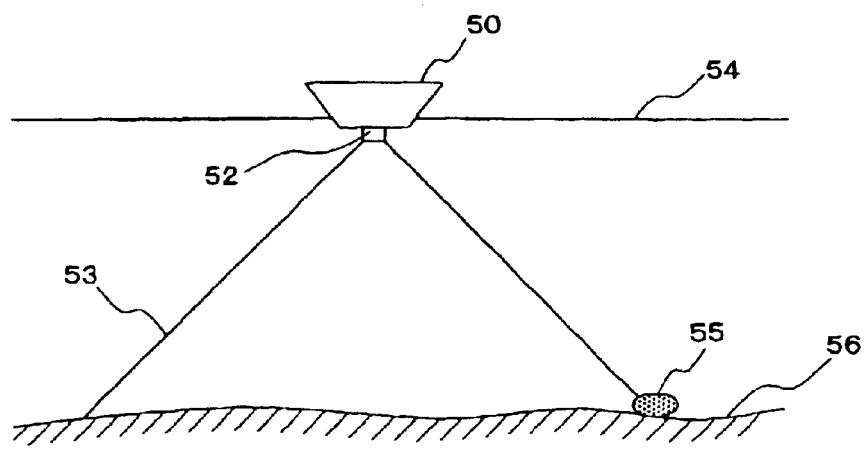
FIG. 17 is a diagram showing a situation in which a fish school existing close to the bottom is tracked.

In this embodiment, echo signals from the bottom and the target are discriminated from each other and the target is automatically tracked based on the predicted target position calculated from the target echo signals. Therefore, even when a fish school 55 exists close to sea bottom 56 as shown in FIG. 17 and the fish echo F lies immediately close to or adjoins the bottom echo G, the scanning sonar 100 can discriminate and track the fish school 55 without incorrectly tracking the bottom 56.

When the echo signals are interrupted resulting in a failure to continue automatic tracking in conventional scanning sonars, the automatic tracking function is automatically switched off and it is needed to reenter a target lock mark through an operator panel for resuming automatic tracking. In this embodiment, however, automatic tracking is continued using an imaginary current target position even when the fish echo F is temporarily interrupted, and when the fish echo F is correctly detected again, the ordinary automatic tracking operation is automatically resumed.

Since horizontal scanning and vertical scanning are performed alternately in the foregoing embodiment, it is possible to prevent crosstalk of the echo signals obtained in the horizontal and vertical scanning modes. The invention is not limited to this alternate mode of scanning. In one variation of the embodiment, horizontal scanning and vertical scanning may be performed at the same time. One advantage of this variation is that it enables an improvement in tilt control response, because the tilt angle for horizontal scanning can be controlled without waiting for the completion of vertical scanning.

Furthermore, although average values of the signal levels are taken along the circumferential direction and along the direction of the horizontal distance R for discriminating the bottom echo G in the examples of FIGS. 8A–8C and 9A–9C, the embodiment may be so modified to use integrated values of the signal levels taken along the circumferential direction and along the direction of the horizontal distance R instead of the average values.

Furthermore, although vertical scanning is made in one direction only in the example shown in FIGS. 5A and 5B, the embodiment may be so modified to perform vertical scanning in two or more directions.

Moreover, although the predicted target position is calculated based on only the speed and course of the ship 51 in the foregoing embodiment, the embodiment may be so modified to calculate the predicted target position based on not only the speed and course of the ship 51 but also the simultaneously obtained moving speed of the target to achieve higher accuracy in performing the automatic tracking operation.

What is claimed is:

1. An automatically tracking scanning sonar which emits an ultrasonic beam in all directions underwater with a specific tilt angle from water surface, detects an echo signal from an underwater target by performing horizontal scanning, displays a target image based on the echo signal, and controls the tilt angle such that the ultrasonic beam is directed to the target, the automatically tracking scanning sonar being characterized in that it performs vertical scanning in addition to the horizontal scanning by emitting an ultrasonic beam having a specific sector angle in a vertical plane directed in a specific horizontal direction and detecting an echo signal from the underwater target, wherein the scanning sonar adjusts the tilt angle of the ultrasonic beam for the horizontal scanning to an angle which enables automatic tracking based on target depth information obtained from the echo signal detected by the vertical scanning.

2. The automatically tracking scanning sonar according to claim 1, wherein the scanning sonar alternately performs the horizontal and vertical scanning.

3. The automatically tracking scanning sonar according to claim 1, wherein the scanning sonar simultaneously performs the horizontal and vertical scanning.

4. The automatically tracking scanning sonar according to claim 1, the scanning sonar comprising:
- a discriminator for discriminating the echo signal received from the target from an echo signal received from the bottom of water among echo signals detected by the horizontal and vertical scanning; and
- a predicted target position calculator for calculating a predicted target position based on the echo signal received from the target identified by said discriminator;
- wherein automatic tracking is executed based on the predicted target position calculated by said predicted target position calculator.

5. The automatically tracking scanning sonar according to claim 4, wherein thresholds are set individually for the level of the echo signals detected by the horizontal scanning and for the level of the echo signals detected by the vertical scanning, and wherein the echo signals detected by the horizontal and vertical scanning are regarded as being received from the bottom when their levels exceed the respective thresholds, and the echo signals detected by the horizontal and vertical scanning are regarded as being received from the target when their levels are equal to or lower than the respective thresholds.

6. The automatically tracking scanning sonar according to claim 5, wherein the threshold for the echo signals obtained by the horizontal scanning is set for average values of signal levels taken at individual horizontal distances along the circumferential direction, whereas the threshold for the echo signals obtained by the vertical scanning is set for average values of signal levels taken at individual depths along the direction of horizontal distance.

7. The automatically tracking scanning sonar according to one of claims 1 to 6, wherein when it becomes impossible to execute ordinary automatic tracking operation due to loss of the echo signal from the target, the scanning sonar continues automatic tracking based on an imaginary target position, and when the echo signal from the target is normally detected again, the scanning sonar resumes the ordinary automatic tracking operation.

8. The automatically tracking scanning sonar according to claim 7, wherein if own ship on which the scanning sonar is installed has moved during a period when the echo signal from the target is not received, the predicted target position is corrected against a moving distance of own ship.

9. The automatically tracking scanning sonar according to claim 7, wherein a mark indicating the target position is displayed in a different appearance when it becomes impossible to execute the ordinary automatic tracking operation as compared with a situation where the ordinary automatic tracking operation is executed.

10. The automatically tracking scanning sonar according to claim 8, wherein a mark indicating the target position is displayed in a different appearance when it becomes impossible to execute the ordinary automatic tracking operation as compared with a situation where the ordinary automatic tracking operation is executed.

11. A method for automatically tracking an underwater object, comprising:
- detecting an echo signal, using an ultrasonic beam being emitted at a tilt angle, during a horizontal scanning mode to detect and display an underwater target being tracked;
- determining depth of said target, from detecting an echo signal using an ultrasonic beam being emitted at a sector angle in a vertical plane directed in a horizontal direction, during a vertical scanning mode;
- in response to the depth of said target being determined, adjusting the tilt angle during said horizontal scanning mode to continue to detect and display said target being tracked.

* * * * *